May 10, 1949. P. R. HUTCHINSON 2,469,730
METHOD OF SHARPENING LAWN MOWER BLADES
Filed July 2, 1947

INVENTOR.
Paul R. Hutchinson
BY
Allard A. Braddock
ATTORNEY

Patented May 10, 1949

2,469,730

UNITED STATES PATENT OFFICE 2,469,730

METHOD OF SHARPENING LAWN MOWER BLADES

Paul R. Hutchinson, Rochester, N. Y.

Application July 2, 1947, Serial No. 758,647

2 Claims. (Cl. 51—281)

This invention relates to an improved method of sharpening lawnmower blades.

Lawn mowers operate on the principle of a shearing action. A multiplicity of spiral-shaped blades rotate rapidly past a parallel fixed, or stationary, blade. Blades of grass which impinge on the fixed, or stationary, blade are severed by the shearing action of the rotating blades with the stationary blade. The rotating blades make actual sliding contact with the stationary blade in their rotation. Conventional lawn mowers become dull rather quickly and the friction caused by the rotating blades sliding over the stationary blade increases the energy required to operate the machine. Most of the noise of operation is caused by the constant contact between the rotating blades and stationary blade.

It is an object of this invention to provide a method of sharpening lawn mower blades which will enable them to stay sharp for a long period of time. Another object is to provide an improved lawn mower which will operate with less noise and effort. Another object is to improve the state of the art. Other objects will appear hereinafter.

These and other objects are accomplished by my invention which includes abrading to smoothness the outer edge of the rotating blades, leaving a small gap between the rotating blades and the stationary blade, and sharpening that face of the rotating blades which approaches the stationary blade when the machine is operated.

Figure 1:
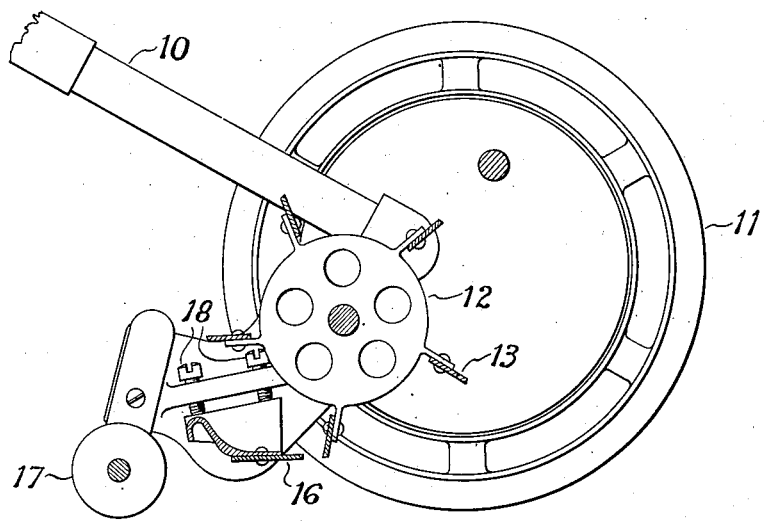
Figure 2:
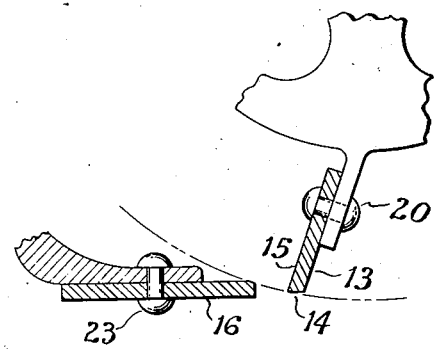
Figure 3:
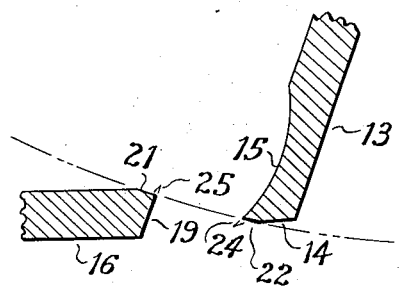
Figure 4:
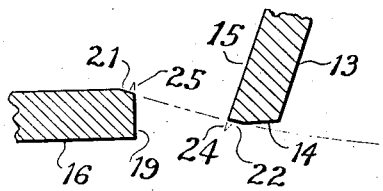

In the accompanying drawing Fig. 1 is a sectional view through the lawn mower showing the stationary blade and five rotating blades. Fig. 2 is an enlarged view of a portion of the section of Fig. 1 showing the stationary blade and one rotating blade. Fig. 3 illustrates a method of hollow-grinding the rotating blade in accordance with my invention. Fig. 4 is an enlarged sectional view of the stationary blade and one rotating blade showing burrs which are present after grinding and before the machine is placed in operation.

Similar numerals refer to similar parts throughout the several views.

Numeral 10 designates the lawn mower handle. Numeral 11 designates one of the wheels which makes contact with the ground. Wheel 11 is geared to rotating mechanism 12 in such a manner that rotating mechanism 12 turns faster than wheel 11. Rotating blades 13 are rigidly attached to rotating mechanism 12. Numeral 14 designates the outer edge of rotating blade 13. Numeral 15 designates the face of the rotating blade which approaches the stationary blade when the machine is operated. Numeral 16 designates the stationary blade. Numeral 17 designates the rotating idler which maintains stationary blade 16 at the proper height above the ground and acts as a rest when the lawn mower is not in use. Numeral 18 designates screws for adjusting the position of the stationary blade. Numeral 19 designates the side of stationary blade 16 which is abraded during sharpening. Numeral 20 designates a rivet which holds rotating blade 13 in place. Numeral 21 designates the upper abraded corner portion of stationary blade 16. Numeral 22 designates the lower abraded portion of rotating blade 13. Numeral 23 designates a bolt or rivet which holds stationary blade 16 in place.

Numeral 24 designates a burr extending downward from face 15 which is intentionally left as shown during the abrading process. Numeral 25 designates a similar burr extending upward from face 19.

In operation the lawn mower is pushed forward and wheel 11 turns. Rotating mechanism 12 turns in the same direction as wheel 11 but several times as fast. In operating the conventional design of lawn mower side 22 of rotating blade 13 makes actual contact with stationary blade 16. As grass impinges on side 19 of stationary blade 16 side 14 of rotating blade 13 approaches. There is some shearing action on the blades of grass between edge 22 of rotating blade 13 and edge 21 of stationary blade 16. There is also a gripping and squeezing action as evidenced by the large quantity of sticky grass juices which collect on the blades.

The conventional lawn mower is sharpened by honing, filing, or grinding side 22 of rotating blades 13. The blades do not stay sharp for long as contact with stationary blade 16 takes away the sharp edge quickly.

In my invention side 22 is preferably made smooth by turning the rotating blades backward and placing emery dust in oil on the edges of the blades which come into contact with stationary blade 16. This treatment smooths sides 22 and 21 and the emery dust abrades the blades enough so that a slight gap is left between sides 21 and 22 and no further adjustment is necessary. If side 22 is smooth, abrasion with emery dust is not necessary and stationary blade 16 is adjusted so that there is a small gap between rotating blade 13 and stationary blade 16. Rotating blades 13 are then honed, filed, or ground on side 15 in such a manner that burr 24 is left extending downward toward stationary blade 16. Stationary blade 16 is honed, filed, or ground on side 19 in such a manner that burr 25 is left extending upward toward rotating blades 13. As soon as the mower is placed in operation the burrs extending toward one another are sheared off leaving very sharp edges with an extremely small gap. Such an arrangement is illustrated in Figs. 3 and 4.

I have discovered that if the approaching blade faces are in the same plane and at an angle with the vertical improved performance results. In Fig. 3 face 15 of rotating blade 13 is at an angle with the vertical when the blade is directly below the center of the radius of rotation due to the fact that the face is hollow ground with an abrasive wheel of short radius. Side 19 may be at an angle with the vertical so that a plane drawn tangent with the bottom portion of face 15 would be substantially parallel to face 19. A preferred angle for this plane is about 22.5° off the vertical. Any angle up to about 30° results in improved performance. It is then a simple and speedy matter to sharpen the blades by filing a small portion of faces 19 and 15 of stationary blade 16 and rotating blade 13, respectively. Burrs are left on the two surfaces extending toward one another and rotation of the rotating blades shears off the burrs to leave very sharp shearing edges.

A lawn mower sharpened in accordance with my invention performs in a manner much improved over a conventional lawn mower. Since the friction caused by the rotating blades sliding over the stationary blade is absent much less energy is expended in operating it, an advantage of importance in both manual and power-driven machines. Since there is no contact between the rotating blades and the stationary blade there is almost no noise during operation and the blades stay sharp for a longer time. Since there is less friction the rotating blades may be geared higher to a give a smoother cut.

What I claim is:

1. The method of sharpening a lawn mower which consists of leaving a small gap between the stationary blade and rotating blades, abrading that face of each rotating blade which rotates toward the stationary blade with a downward motion in order to leave a burr extending in a direction away from the center of the radius of rotation of the blades, abrading the forward face of the stationary blade with an upward motion in order to leave a burr extending upward, and shearing the burrs by rotating the rotating blades.

2. The method of sharpening lawn mower blades which comprises adjusting the stationary blade and rotating blades to leave a very small gap therebetween, abrading the approaching vertical faces of the rotating blades and cutter blade leaving a burr extending from each rotating blade toward the stationary blade and from the stationary blade toward the rotating blades, and shearing the several burrs by rotating the rotating blades.

PAUL R. HUTCHINSON.

REFERENCES CITED

The following references are of record in the file of this patent:

UNITED STATES PATENTS

| Number | Name | Date |
|---|---|---|
| 1,406,298 | Stippich | Feb. 14, 1922 |
| 2,149,774 | Ingleman | Mar. 7, 1939 |